United States Patent [19]

Hosogoe et al.

[11] Patent Number: 5,173,321

[45] Date of Patent: Dec. 22, 1992

[54] FLAVORED KONNYAKU COMPOSITON, PROCESS FOR PREPARING SAME AND FOOD PRODUCT CONTAINING SAME

[75] Inventors: Masatoshi Hosogoe; Kenichi Hashimoto, both of Tokyo; Yumi Kawauchi, Kamifukuoka, all of Japan

[73] Assignee: Nippon Oil and Fats Co., Ltd., Tokyo, Japan

[21] Appl. No.: 690,457

[22] Filed: Apr. 24, 1991

[30] Foreign Application Priority Data

Apr. 28, 1990 [JP] Japan .................................. 2-112288
Apr. 10, 1991 [JP] Japan .................................. 3-77790

[51] Int. Cl.$^5$ ............................................ A23L 1/0528
[52] U.S. Cl. .................................... 426/573; 426/578; 426/96; 426/99; 426/661
[58] Field of Search ................... 426/96, 99, 550, 573, 426/578, 661

[56] References Cited

U.S. PATENT DOCUMENTS 1,286,904 12/1918 Atkimson .............................. 426/562
4,022,917  5/1977 Sebenke ................................ 426/99
5,049,401  9/1991 Harada et al. ....................... 426/573

Primary Examiner—Joseph Golian
Attorney, Agent, or Firm—Jordan and Hamburg

[57] ABSTRACT

A flavored konnyaku compositon contains a konnyaku gel structure having a pH value ranging within 6 to 8 substantially uniformly in its entirety and a seasoning material distributed in the gel structure substantially uniformly in its entirety. A process for preparing the flavored konnyaku composition involves solating a starting material containing powdered konnyaku, an acidic agent coated with and encapsulated in a coating agent and a seasoning material, adding an alkaline coagulating agent to the starting material to gelate the starting material to obtain a konnyaku gel structure, and heating and melting the coating agent of the acidic agent encapsulated therein present in the gel structure to thereby release the acidic agent into the gel structure.

11 Claims, No Drawings

FLAVORED KONNYAKU COMPOSITON, PROCESS FOR PREPARING SAME AND FOOD PRODUCT CONTAINING SAME

BACKGROUND OF THE INVENTION

The present invention relates to a flavored konnyaku composition, a process for preparing the same and a food product containing the same, and more particularly to a flavored konnyaku composition excellent in taste and flavor and useful for reducing the calories of various food products, a process for preparing the same and a food product containing the same.

The term "Konnyaku" used in this specification and in the appended claims means a Japanese food in gel form mainly consisting of glucomannan prepared from powdered konnyaku obtained by drying the roots of a perennial herb of the taro family with botanical name of *Amorphophallus Konjac C. Koch, A. bulbifer, A. oncohyllus, A. variabilis, A. blumei* and *A. rivieri.*

Recently, as the European and American eating habit prevails gradually among people, obesity resulting from the increase in the fat ingestion and overintake of calories so that the adverse effect of the obesity on the heart is coming to the fore as a problem, thereby creating the increasing demand for the development of low-fat and low-caloric foods. Recent consumers, however, are not satisfied simply with the low caloric foods but they are seeking the low-caloric food with rich flavor.

Especially, the food products produced mainly by using animal meat such as hamburger are known as the food products of relatively high fat content and high calorie. For example, hamburger has 13.4% fat content and the calorific value of 223 kcal per 100 g; Vienna sausage 23.0% fact content and 304 kcal per 100 g; and meat balls 16.4% fat content and 244 kcal per 100 g (Source: Fourth Revised Edition of Food Composition Table). Thus, there is a strong demand for the substantial reduction of the calories of the food products such as processed meat products, processed fish meat products and sweets including desserts.

Conventionally, the use of konnyaku as a non-calorie food for reducing the calorific value of the food product has been known. Konnyaku is a high-alkali food with pH value of 11 to 12 obtained by swelling with water powdered konnyaku mainly consisting of glucomannan, which is not digestible with the human digestive enzymes, and turning into a gel form by adding an alkaline coagulating agent thereto. By heating or freezing konnyaku, its peculiar elastic mouth feel touch is increased to become close to that of meat. Thus, it has been proposed to substitute konnyaku for some part of ground meat or to knead and mix konnyaku together with the raw materials of a food product containing ground meat.

More particularly, a method of using konnyaku in the form of chopped pieces or in the minced form ground by a mincer has already been proposed (Refer to Japanese Laid-open Patent Application No. 57-33571 and Japanese Laid-open Patent Application No. 58-78571). The method, however, has disadvantages in that astringent taste is felt as highly alkaline konnyaku is used as it is, and that when a large amount of konnyaku is used, the taste of the food product is seriously decreased. Besides, if the commercially available konnyaku is used after flavoring, not only the flavor will not penetrate well into inside because of highly alkaline nature of the commercially available konnyaku but also the taste of the food will be adversely affected by the alkali to kill the effects of the seasonings. Thus, another method has been proposed (Refer to Japanese Laid-open Patent Application No. 63-254962). In this method, the ordinary commercially available konnyaku is chopped and immersed in a weakly acidic solution to adjust the pH of konnyaku. Alternatively, after a small amount of alkali substance is added to the ordinary commercially available konnyaku and heated, weak acid is added for pH adjustment to obtain konnyaku in paste form. This method, however, is disadvantageous in that the surface of konnyaku is apt to be softened while immersed in the weakly acidic solution for pH adjustment, and it takes a considerably long time period for the acid to penetrate uniformly into the inside of konnyaku texture, and konnyaku as a whole is susceptible to adverse effect of the acid. Besides, even with the use of acid-treated konnyaku immersed in acid, it is difficult to flavor konnyaku evenly in its entirety.

On the other hand, there is proposed (Refer to Japanese Laid-open Patent Application No. 1-153060) another method, wherein, in order to improve the mouth feel touch of konnyaku itself, an alkaline substance is added to a sol composed of gel forming materials such as carrageenan or starch, powdered konnyaku and water is added to obtain a substance in the paste or liquid form, which is then mixed with ground meat components and frozen to manufacture a food product. The food product is heated when cooking to react with the alkaline substance added to the sol to turn the substance in the paste or liquid form into gel form. This method contributes to the improvement of the mouth touch feel of konnyaku but not to the improvement of the flavor of konnyaku.

SUMMARY OF THE INVENTION

An object of the present invention is to provide a flavored konnyaku composition and a process for preparing the same, in which the calorific value of food product itself is reduced without spoiling the flavors and mouth feel touch of various food products.

Another object of the present invention is to provide a flavored konnyaku composition and a process for preparing the same, which has a substantially uniform flavored taste all through the konnyaku gel structure.

A further object of the present invention is to provide a low-calorie and low-fat food product wherein the flavors of materials and seasonings are maintained.

The above and other objects of the present invention will become more apparent from the following description.

The present invention provides a flavored konnyaku composition comprising a konnyaku gel structure having a pH value ranging within 6 to 8 substantially uniformly in its entirety and a seasoning material distributed in the gel structure substantially uniformly in its entirety.

Also, the present invention provides a process for preparing a flavored konnyaku composition comprising solating a starting material containing a powdered konnyaku, an acidic agent coated with and encapsulated in a coating agent and a seasoning material, adding an alkaline coagulating agent to the starting material to gelate the starting material to obtain a konnyaku gel structure, and heating and melting the coating agent of the acidic agent encapsulated therein present in the gel structure to thereby release the acidic agent into the gel structure.

Further, the present invention provides a food product including the flavored konnyaku composition.

PREFERRED EMBODIMENTS OF THE INVENTION

The present invention will be described in further details hereunder.

The flavored konnyaku composition according to the present invention contains a gel structure of konnyaku with pH value ranging between 6 and 8 substantially uniformly in its entirety and a seasoning material distributed in the gel structure substantially uniformly in its entirety. The seasoning material is evenly distributed both at the surface and inside of the konnyaku gel structure, while the pH value of the gel is within the range of 6 to 8 or near the neutrality. If the pH is less than 6, the structure of the konnyaku gel tends to soften, whereas if the pH exceeds 8, the flavor or the taste of the seasoning material is adversely affected and the flavor will not penetrate sufficiently into the inside of the konnyaku gel structure due to the effect of alkali.

In preparing the flavored konnyaku composition according to the present invention, the starting material containing powdered konnyaku, an acidic agent coated with and encapsulated in a coating agent and the seasoning material are first solated. The powdered konnyaku contains konnyaku ingredients such as refined konnyaku powders, refined glucomannan, etc. and has properties to react with an alkaline coagulating agent, which will be described in detail later, to change into the gel form. The commercially available powdered konnyaku may be used.

The acidic agent contained in capsules formed by the coating agent is a core, and the surface of the acidic agent is substantially covered with the coating agent. The coating agent is formed into the capsules in order to prevent the acidic agent from being melted or dissolved into water during the solation step. The capsule containing the acidic agent may preferably have a particle size within the range of 1 to 1000 $\mu$m. The reason for covering the acidic agent with the coating agent is to prevent the alkaline coagulating agent from being neutralized by the acidic agent during the step for gelating the starting material since the presence of the acidic agent negatively affects the gel formation. The acidic agent contained in the capsules according to the present invention is released to outside to neutralize the alkali as the capsules melt after the gel structure is formed. As the preferred acidic agent, for example, acetic acid, citric acid, fumaric acid, adipic acid, tartaric acid, malic acid, etc. may be enumerated. As the coating agent, a substance to take the solid state at room temperature and insoluble in water may be used. Preferably a hydrophobic material such as hardened oils, higher fatty acids, fatty acid monoglycerides, waxes or mixtures thereof may be used. Most preferably the coating agent having a melting point which melts upon heating described in detail later to cause the acidic agent to elute, may be enumerated. The melting point may preferably be set, depending on various conditions such as temperatures and time periods at which the starting material sol swells, reaction temperatures and time periods for gelling the starting material, or the concentrations and kinds of the alkali coagulating agents. More particularly the melting point may preferably be not less than 50° C. and more preferably 60° to 70° C.

As the raw material oils for the aforementioned hardened oil, vegetable oils such as coconut oil, palm kernel oil, rapeseed oil, palm oil, cotton seed oil, olive oil, groundnut oil, soybean oil, linseed oil, castor oil; fish oils such as herring oil and cod liver oil; and animal oils such as lard and beef tallow may be enumerated. To obtain the hardened oil from these raw material oils, for example, the raw material oil is put in a pressure vessel with a catalyst such as reducing nickel; a hydrogen gas is blown into the raw material oil to raise the internal pressure to 0 to 5 kg/cm$^2$ while the pressure vessel is heated at 120° to 300° C. to add hydrogen atoms or hydrogenate unsaturated double bonds in the raw material oil; after the reaction is completed, the catalyst is removed by filtration; and the oil further undergoes the deodorizing and refining processes. The melting point of the hardened oil obtained by the process can be adjusted depending on the degree of the hydrogenation and the compositions. For example, where the extremely hardened oil (oil hydrogenated to a maximum) as a saturated fatty acid glyceride is employed, the melting points of various raw material oils are 32° to 35° C. for coconut oil; 56° to 58° C. for palm oil; 62° to 63° C. for cotton seed oil; 65° to 70° C. for rapeseed oil; and 67° to 70° C. for soybean oil, so that the melting point of the coating agent can be selected depending on the melting points of the raw material oils to be used. The raw material oil need not necessarily be an extremely hardened oil. Similarly, where higher fatty acid, fatty acid monoglyceride or wax is to be used, the coating agent can be selected depending on the melting points of the raw material oils and the aforementioned various conditions.

As for the acidic agent coated with and encapsulated in the coating agent, the mixing ratio of the acidic agent and coating agent may preferably be within the range of 99:1–10:90 and more preferably within the range of 70:30–40:60. The ratio of the acidic agent coated with an encapsulated in the coating agent contained in the starting material may be selected depending on kinds of the acidic agents, kinds and quantities of the seasoning materials and the quantities of the alkaline coagulating agents, which will be described later, and the ratio of the acidic agent may be determined so that the pH of the flavored konnyaku composition to be obtained finally is 6 to 8.

To prepare the acidic agent coated with and encapsulated in the coating agent, for example, the known method may be employed such as the flow coating method, the spraying method wherein the coating agent is sprayed over the surface of the acidic agent to form the solidified coating by cooling, or the surface treatment method (Refer to Laid-open Japanese Patent Application No. 63-164863), wherein the acidic agent is contacted or impinge against the coating agent so that the coating agent is melted by heat generated by the impingement to thereby adhere to the whole surface of each core acidic agent to form the coating.

As the seasoning material, acidic, neutral and alkaline seasonings may be used, so that various seasonings can be selected to obtain the flavored konnyaku composition to enable the food product containing the flavored konnyaku to have the flavor similar to that of the food product not containing the flavored konnyaku. More particularly, for example, animal extracts such as beef extract, chicken extract and pork extract; savory seasonings such as sodium glutamate, inosinic acid and guanylic acid; the above mentioned animal extracts seasoned with the savory seasonings; amino acid type seasonings such as hydrolyzed animal protein and hydrolyzed vegetable protein; table salt, sugar, honey, spices, seasoning oils, milk and fruit sugar; and seasoning for masking the raw smell of konnyaku may be enumerated as preferable seasonings.

The mixing ratios of the seasoning material may selectively be varied to match with the flavors of the feed materials of the desired food products. Where the acidic seasoning is used, the alkaline coagulating agent, which will be described later, may be added immediately after adding the acidic seasoning, or the acidic seasoning may be neutralized with a weakly alkaline substance to the extent not to spoil the flavor of the acidic seasoning before adding the aciding seasoning so that the formation of the gel structure will not be hindered, since the acidic seasoning can adversely affect the gel formation. Thus, the mixing ratio of the acidic seasoning to the total quantity of konnyaku composition may preferably be not more than 3% by weight, most preferably 0.5 to 2% weight.

The starting material according to the present invention may contain an additive such as gel stabilizing agents such as starches, celluloses, polysaccharides and proteins; improvers or flavor enriching agents such as edible oils and fats, if necessary.

To solate the starting material, there may be employed a method wherein the acidic agent coated with and encapsulated in the coating agent is evenly mixed with the powdered konnyaku, swollen with water and then mixed with the seasoning material and optionally with other additives, or another method wherein the starting material containing the encapsulated acidic agent and the seasoning material is mixed evenly with the powdered konnyaku and swollen with water. The quantity of the water to be used to swell the starting material may preferably be 15 to 40 times by weight that of the powdered konnyaku. If the quantity of the water used is less than 15 times by weight that of the powdered konnyaku, the swelling of the powdered konnyaku may be incomplete to cause the poor mouth touch of the konnyaku composition, whereas, if the quantity of the water used exceeds 40 times by weight that of the powdered konnyaku, the strength of the gel to be formed may be insufficient, thereby, for example, decreasing the meat like feeling at the time of chewing. The temperature of the water to be used for swelling is not specially limited but may preferably be within the range of 15° to 35° C., and the time period for swelling may preferably be decided depending on the temperature of the water for swelling and the quantity of the powdered konnyaku. More particularly, at 20° C., 3 to 4 hours are long enough for swelling.

In preparing the flavored konnyaku composition according to the present invention, after the starting material is solated, the alkaline coagulating agent is added to gelate the solated mass.

The alkaline coagulating agent, for example, may preferably be selected from slaked lime (calcium hydroxide), sodium carbonate, potassium carbonate, sodium hydrogencarbonate, monosodium phosphate, disodium phosphate, trisodium phosphate, shell calcium, egg shell calcium and mixtures thereof.

The quantity of the alkaline coagulating agent to be used varies depending on the kinds of the alkaline coagulating agents and may preferably be 0.02 to 0.06 times by weight that of the powdered konnyaku. The quantity less than 0.02 times will cause gel strength to be insufficient and the quantity exceeding 0.06 times will spoil the flavor of the konnyaku composition.

To gelate the solated mass using the alkaline coagulating agent, the alkaline coagulating agent is added to the solated mass and stirred preferably for 2 to 5 minutes. The reaction temperature is not limited to any particular temperature as far as the temperature is lower than the melting point of the coating agent and permits the gelling reaction to take place. The reaction temperature may preferably be within the range of 15° to 35° C. Also, as discussed previously, when the acidic seasoning is used, the alkaline coagulating agent may be added and stirred immediately following the addition of the acidic seasoning so that the starting material can readily take the gel form without being affected by the acid.

To obtain the flavored konnyaku composition according to the present invention, the coating agent in which the acidic agent is encapsulated is melted by heat treatment to cause the acidic agent to flow out.

The conditions for the heat treatment is not limited to any particular temperature as far as the coating agent covering the acidic agent is melted completely and may be decided depending on the melting points of the coating agent and the quantity of the alkaline coagulating agent. The duration of the heat treatment may preferably be within 5 minutes to 1 hour to permit the innermost part of the konnyaku gel to be 85° to 130° C. The konnyaku gel composition may be heated in a boiling tank (steam type or hot water type), high temperature heating and sterilizing equipment (retort), etc.

The flavored konnyaku composition according to the present invention may normally be obtained in the sheet form and can be changed into any desired form such as minced or chopped form or paste form using, for example, a meat chopper or a silent cutter.

The food product according to the present invention contains the flavored konnyaku composition to reduce the caloric value and fat content of the food product without spoiling the original flavor or taste of the food product. The food products are not particularly limited. For example, the present invention is applicable to the preparation of food products using ground animal meat such as hamburger, hamburger pate, meat ball, sausage, ground meat cutlet, dumpling stuffed with minced pork, shao-mai, meat bun, cabbage roll, meat pie, meat loaf and scotch egg; food products using ground fish meat such as boiled fish paste, fish meat sausage, broiled fish paste and fried fish ball; and desserts such as cheese cake, jelly, Bavarian cream and pudding. The present invention is especially useful for application to the food products with relatively high caloric values such as hamburger, hamburger pate, meat ball and sausage among the aforementioned food products.

The content of the flavored konnyaku composition in the food product may preferably be within 10 to 80% by weight, most preferably within 20 to 50% by weight and particularly within 40 to 50% by weight. If the content of the flavored konnyaku composition is less than 20% by weight, the caloric value and fat content cannot be reduced adequately, whereas, if more than 80% by weight, the cohering strength of, for example, the ground meat or ground fish meat will become too weak to be molded. The flavored konnyaku composition may be used either in the form suitable for being mixed with various ground meats or in the paste form suitable for being mixed with sweet materials such as desserts according to the standard methods of application. The flavored konnyaku composition may preferably be used by mixing well with the main feed materials of the food product before use for ensuring satisfactory workability of the feed materials. The food product containing the flavored konnyaku composition may be frozen and defrosted upon use.

To prepare, for example, hamburger the flavored konnyaku composition enough in quantity to reduce the calorie from the meat to the desired level may be mixed with ground meat, chopped vegetables, thickeners, seasonings and cohering additives and kneaded uniformly using a mixer. The kneading of the feed materials may preferably be conducted at a lowest possible temperature (at temperatures lower than 15° C.) in order to prevent the feed materials from being contaminated with microorganisms and deteriorated. Then, the mixture is molded into a desired shape and frozen.

The konnyaku composition according to the present invention is flavored uniformly throughout its gel structure to match with a food product to be mixed, so that the flavored konnyaku composition may be used for reducing the caloric value and fat content of various food products without spoiling their original flavors, tastes and mouth feel touch and, if necessary, readily permits the additional flavor to penetrate into the inside of konnyaku composition since the pH of the konnyaku composition is kept at the level near the neutrality. Also, the konnyaku composition can take different forms and shapes depending on the various food products to be mixed with. In the preparation process according to the present invention, an acidic agent coated with and encapsulated in the coating agent is used, so that a uniform pH level and flavor can be maintained throughout the gel structure of the konnyaku composition. Further, the food product according to the present invention contains the flavored konnyaku composition, so that the caloric value and fat content of the food product are reduced without spoiling the original flavor, taste and mouth feel touch of the food product.

EXAMPLES OF THE INVENTION

The present invention will be described in detail with reference to the specific examples, but the present invention is not limited to these examples.

EXAMPLE 1

Preparation Example of Encapsulated Fumaric Acid 280 g of finely divided powders of fumaric acid with an average particle size of 200 μm and 120 g of finely divided powders of hardened soybean oil (melting point: 65° C.) with an average particle size of 20 μm were mixed and the surfaces of the fumaric acid particles were then coated with hardened soybean oil as a hydrophobic substance by the surface coating process using a mixer sold under the trade name "NARA HYBRIDIZATION SYSTEM" (Nara Machinary Co., Ltd.) at 25° C. and at 1000 rpm to obtain fumaric acid coated with and encapsulated in hardened soybean oil.

Preparation Example of Flavored Konnyaku (Beef flavor)

After 180 g of refined konnyaku powders, 20 g of guar gum and 8 g of the encapsulated fumaric acid were mixed sufficiently, and swollen by a mixture of 3,800 g of water at 20° C. into which 40 g of honey and 4 g of caramel had been dissolved in a stainless steel beaker (with the capacity of 5 liters), the swollen mass was transferred into a 10 liter kneader. Separately, to 80 g of beef extract (Trade name: "AJIPOL BEEF MC" with pH value of 5.3 manufactured by Dainippon Pharmaceutical Co., Ltd.), 2.4 g of sodium carbonate was added to adjust the pH value to 6.8 followed by adding and mixing 20 g of table salt and 0.4 g of ribonucleotide sodium (Trade name: "RIBOTIDE" manufactured by Takeda Chemical Industries, Ltd.) to obtain a seasoning. The seasoning was added to the swollen mass in the kneader. Then, the mass in the kneader was mixed uniformly and immediately mixed with milk of lime (obtained by suspending 6 g of calcium hydroxide in 200 g of water) followed by stirring for 3 minutes to gelate the mass.

The pH value of the obtained konnyaku gel was measured at optionally selected three points on the surface and at optionally selected five inside points of the konnyaku gel by a pH meter (Trade name: "PERSONAL PH METER" manufactured by Yokogawa Electric Corporation) to find that all the measured values were 10.0 to 10.5. Then, the konnyaku gel was packed in a polypropyrene bag and heated for 40 minutes in a boiling tank containing 90° C. hot water to obtain a sheet-form beef-flavored konnyaku. The pH value of the sheet-form konnyaku was also measured in the same manner as described above to find that all the measured values were 7.0 to 7.5. The results indicate that by the heating treatment in the boiling tank the coating agent capsules containing fumaric acid was melted to release fumaric acid into the konnyaku gel to almost neutralize konnyaku throughout the gel structure thereof.

Preparation Example of Low-caloric Value Hamburger

To 1,140 g of shoulder beef ground by a 3.2 mm mesh meat grinder, there were added 12 g of table salt, 9 g of pepper, 45 g of soybean protein powders (Trade name: "SORUPII 600", manufactured by Nisshin Oil Manufacture Co., Ltd.), 9 g of sodium tripolyphosphate and 60 g of water and the mixture was kneaded with a mixer. Then, 1,140 g of beef-flavored konnyaku ground with a 3.2 mm mesh meat grinder, 390 g of chopped onion and 195 g of bread crumb were mixed uniformly with a mixer. Then, the obtained mixture was molded into an oval shape, frozen rapidly at −40° C. and heated on a frying pan to prepare a piece of hamburger containing the flavored konnyaku for serving. The caloric value (139 kcal/100 g) of the cooked hamburger was lower by about 40% than that (238 kcal/100 g) of the ordinary hamburger.

The taste, flavor, color and mouth feel touch of the hamburger containing the flavored konnyaku were tested by 10 panelists. The panelists apprased their judgments into three levels in comparison with the taste, flavor, color and mouth feel touch of the ordinary hamburger in such manners that the grade equal to or better than the ordinary hamburger was denoted by a circle (◯), a little lower grade by a triangle (Δ) and markedly lower grade by letter (×). The result is shown in Table 1.

EXAMPLE 2

Preparation Example of Flavored Konnyaku (Pork Flavor)

120 g of refined konnyaku powders, 8.8 g of the encapsulated fumaric acid prepared in Example 1 and 12 g of microcystalline cellulose (Trade name: "AVICEL" manufactured by Asahi Chemical Industry Co., Ltd.) were mixed sufficiently, put in 3,600 g of 30° C. water into which 32 g of table salt and 20 g of sugar had been dissolved using a stainless steel beaker (Capacity: 5 liters), swollen therein for 2 hours and transferred into a kneader with the capacity of 10 liters. Separately, 80 g of pork extract (Trade name: "FL PORK MEAT S" manufactured by Asahi Foods Co., Ltd.), 0.8 g of nutmeg and 0.4 g of white pepper were mixed to obtain a mixed seasoning and added to the swollen mass in the kneader. Then, after the mass was mixed uniformly, milk of lime (6 g of calcium hydroxide suspended in 400 g of water) was immediately mixed and stirred for 3 minutes to gelate the mass. The pH value of the obtained konnyaku gel was measured in the similar manner to that of Example 1 to find that all the measured pH values were 10.5 to 11.0. Then, the konnyaku gel was packed in a retort pouch and heated in the retort for 40 minutes using hot water of 120° C. to obtain the pork-flavored sheet-form konnyaku. For the obtained konnyaku, the pH value was measured in the similar manner to find that all the measured pH values were 7.2 to 7.6. This indicates that the capsules formed with the coating agent containing the fumaric acid were melted to let the fumaric acid flow into the konnyaku gel to almost neutralize the konnyaku gel throughout the gel structure.

Preparation Example of Low-caloric Vienna Sausage

After 800 g of the pork-flavored konnyaku was ground with a 2.4 mm mesh meat grinder, 800 g of pork ham ground with a 4.5 mm mesh meat grinder were mixed lightly. 200 g of iced water, 40 g of table salt, 6 g of sugar, 4 g of potassium nitrate, 0.2 g of sodium nitrite, 4 g of pork seasoning, 80 g of egg albumen, 8 g of sodium polyphosphate, 0.06 g of sodium L-ascorbate and 4 g of spice mix were added and mixed uniformly in a silent cutter. Then, the mixture was stuffed into the sheep intestines, dried for 30 minutes, smoked for 30 minutes at 60° C. and steamed for 45 minutes at 75° C. to obtain Vienna sausage containing the flavored konnyaku. The caloric value (139 kcal/100 g) of the obtained Vienna sausage was lower by about 30% than that (195 kcal/100 g) of the ordinary Vienna sausage not containing the flavored konnyaku. The test by the 10 panelists was also conducted in the same manner as that of Example 1. The result of the test is given in Table 1.

EXAMPLE 3

The pork-flavored sheet-form konnyaku obtained in Example 2 was ground by a 4 mm mesh chopper to obtain ground-meat-like konnyaku.

Preparation Example of Low-caloric Dumpling Stuffed with Minced Pork 460 g of ground pork, 460 g of the ground-meat-like konnyaku, 800 g of cabbage, 80 g of scallion, 80 g of spring onion and 60 g of egg were mixed and kneaded lightly. 4 g of garlic, 8 g of ginger, 30 of soy sauce, 4 g of table salt and 14 g of sesame oil were added and mixed altogether to obtain stuffing of dumpling. The stuffing thus obtained was stuffed into dumpling crust and steamed followed by roasting to obtain low-cloric dumpling. The caloric value (143 kcal/100 g) of the obtained dumpling stuffed with minced pork was lower by about 20% than that (183 kcal/100 g) of the ordinary dumpling stuffed with minced pork not containing the flavored konnyaku. The dumpling stuffed with minced pork was also tested by the 10 panelists in the same manner as that of Example 1. The result of the test is shown in Table 1.

EXAMPLE 4

Preparation Example of Konnyaku Paste for Fish Meat Food Product 100 g of refined konnyaku powders, 2 g of the encapsulated fumaric acid prepared in Example 1 and 80 g of alpha starch deriving from waxy corn were mixed sufficiently, dispersed in 3,600 g of 25° C. water using a homogenizer (Trade name: "TK HOMO MIXER" by Tokushu Kikakogyo Co., Ltd.) to swell the mixture for 2.5 hours and transferred to a kneader with capacity of 10 liters. Then, 40 g of amino acid seasoning (Trade name: "MP-K1" manufactured by Asahi Foods Co., Ltd.) and 20 g of table salt were added and mixed evenly. Then, immediately after mixing, milk of lime (obtained by suspending 4 g of calcium hydroxide in 400 g of water) was mixed with the mixture and stirred for 5 minutes to gel the mixture.

The pH value of the obtained konnyaku gel was measured at optional 3 points on the surface and optional 5 inside points similarly to Example 1 to find that all the measured values were 10.2 to 10.6. Then, the konnyaku gel was packed in a retort pouch and heated by a hot water type retort for 30 minutes with 120° C. hot water to obtain sheet-form flavored konnyaku. For the obtained konnyaku, the pH value was measured in the same manner as that described above to find that all the measured values were 6.6 to 6.8. This indicates that the capsules formed with the coating agent containing fumaric acid were melted by the heat of the retort treatment to let the fumaric acid flow into the konnyaku gel to almost neutralize the konnyaku throughout the gel structure. Then, the obtained sheet-form flavored konnyaku was ground into paste by a silent cutter.

Preparation Example of Low-caloric Boiled Fish Paste type Ground Fish Meat Food 2,000 g of defrosted ground meat of walleye pollack and 60 g table salt were mixed preliminarily and then mixed with 800 g of flavored konnoyaku in the paste form, 60 g of sugar, 60 g of potato starch, 100 g of egg albumen, 20 g of sodium glutamate and 800 g of water. Then, all these materials were ground for 3 minutes by a silent cutter to obtain a composite ground fish meat mixture.

Then, this composite ground fish meat mixture was stuffed in sausage casing, boiled for 40 minutes at 90° C. and cooled with cold water for 2 hours to obtain a boiled fish paste type food product. The caloric value (58 kcal/100 g) of the obtained boiled fish paste type food product was lower by about 20% than that (71 kcal/100 g) of the ordinary fish paste food product not containing the flavored konnyaku. For the obtained boiled fish paste type food product, the test was conducted in the same manner as that in Example 1, and the result of the test is shown in Table 1.

EXAMPLE 5

Preparation Example of Flavored Konnyaku for Dessert 88 g of refined konnyaku powders, 0.8 g of the encapsulated fumaric acid prepared in Example 1 and 16 g of fruit sugar were fully mixed and added to a mixture of 3,000 g of 20° C. water and 600 g of milk in a stainless steel beaker for swelling for 3 hours. Then, the mixture was transferred to a kneader with capacity of 10 liters and mixed with milk of lime (2 g of calcium hydroxide suspended in 400 g of water) and stirred for 4 minutes to change the mixture into gel. The pH value of the obtained konnyaku gel was measured at optional 3 points on the surface and optional 5 inside points in the same manner as that of Example 1 to find that all the measured pH values were 9.6 to 9.8. Then, the konnyaku gel was packed in a polypropyrene bag and heated for 40 minutes in a boiling tank with 90° C. water to obtain sheet-form flavored konnyaku. For the obtained konnyaku, the pH value was measured in the same manner as that described above to find that all the measured pH values were 6.6 to 6.8. This indicates that the coating agent forming the capsules containing fumaric acid was melted due to the heat of the retort treatment to let the fumaric acid flow into konnyaku gel to almost neutralize the konnyaku throughout the whole gel structure. Then, the obtained sheet-form flavored konnyaku was changed into paste using a juice mixer.

Preparation Example of Low-calorie Cheese Cake 800 g cream cheese, 300 g of sugar and 280 g of milk were mixed and heated at 70° C. to obtain a creamy mixture, then mixed with 240 g of an aqueous solution of gelatin prepared after swelling the gelatin with water (5 times the quantity of the gelatin), cooled to about 40° C. and mixed with 600 g of whipped fresh cream to obtain cheese cake body. The obtained body of cheese cake was mixed with paste of the flavored konnyaku until a uniform mixture was obtained and cooled to obtain finished cheese cake. The caloric value (234 kcal/100 g) of the finished cheese cake was lower by about 25% than that (307 kcal/100 g) of the ordinary cheese cake not containing the flavored konnyaku. For the obtained cheese cake, the test by the panelists was conducted in the same manner as that of Example 1, and the result of the test is shown in Table 1.

COMPARATIVE EXAMPLE 1

Hamburger was prepared by the same process as that in Example 1, except that the commercially available konnyaku (cubically shaped konnyaku with pH value of 11.4) ground by a 3.2 mm mesh meat grinder was used instead of the beef-flavored konnyaku. The caloric value of the obtained hamburger in this Comparative Example was almost equal to or slightly lower than that of the hamburger of Example 1. Also, the test by the panelists was conducted for the prepared hamburger, and the result of the test is shown in Table 1.

COMPARATIVE EXAMPLE 2

The Vienna sausage was prepared by the same process as that in Example 2, except that the commercially available cubically shaped konnyaku with pH value of 11.4 ground by a 2.4 mm mesh meat grinder was used instead of the pork-flavored konnyaku. The caloric value of the prepared Vienna sausage was equal to or slightly lower than that of the sausage in Example 2. For the prepared Vienna sausage, the test by the panelists was conducted in the same manner as that of Example 1, and the result of the test is shown in Table 1.

TABLE 1

|  | Taste | Flavor | Color | Mouth Feel Touch |
|---|---|---|---|---|
| Ex. 1 | ○ | ○ | ○ | Δ |
| Ex. 2 | ○ | ○ | ○ | ○ |
| Ex. 3 | ○ | ○ | ○ | ○ |
| Ex. 4 | ○ | ○ | ○ | ○ |
| Ex. 5 | ○ | ○ | Δ | ○ |
| Comp. Ex. 1 | X | X | Δ | X |
| Comp. Ex. 2 | X | X | X | Δ |

TABLE 1-continued

From the results of the tests shown in Table 1, it is noticed that the food products according to the present invention presented taste, flavor, color and mouth feel touch almost equal to those of the ordinary food products not containing the flavored konnyaku. On the other hand, the results of the tests conducted for the food products prepared using the commercially available konnyaku in the Comparative Examples 1 and 2 are found to be much inferior to the food products prepared using the flavored konnyaku according to the present invention in that flavor was rather watery and had some disagreeable taste such as astringent taste.

Although the present invention has been described with reference to the specific examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A process for preparing a flavored konnyaku composition comprising mixing a starting material containing powdered konnyaku and an acidic agent coated with and encapsulated in a coating agent, swelling the starting material containing the encapsulated acidic agent with water to solate said starting material, mixing the swollen starting material containing the encapsulated acidic agent with an acidic seasoning material, immediately adding an alkaline coagulating agent to the mixture of swollen starting material, encapsulated acidic agent and acidic seasoning agent to gelate said starting material and to obtain a konnyaku gel structure and heating and melting said coating agent of said acidic agent which is present in said gel structure in encapsulated form to thereby release said acidic agent into said gel structure.

2. The process of claim 1, wherein said powdered konnyaku is selected from the group consisting of refined konnyaku powders, refined glucomannan and mixtures thereof.

3. The process of claim 1, wherein said acidic agent encapsulated in the coating agent is selected from the group consisting of acetic acid, citric acid, fumaric acid, adipic acid, tartaric acid, malic acid and mixtures thereof.

4. The process of claim 1, wherein said coating agent is selected from the group consisting of hardened oils, higher fatty acids, fatty acid monoglycerides, waxes and mixtures thereof.

5. The process of claim 1, wherein said coating agent has a melting point of not less than 50° C.

6. The process of claim 1, wherein a mixing ratio by weight of the acidic agent and the coating agent is 99:1 to 10:90.

7. The process of claim 1, wherein the coating agent is attached to cover overall surfaces of the acidic agent by contacting said coating agent with said acidic agent to impinge against said acidic agent.

8. The process of claim 1, wherein said water is 15 to 40 times by weight that of the powdered konnyaku.

9. The process of claim 1, wherein said alkaline coagulating agent is selected from the group consisting of slaked lime, sodium carbonate, potassium carbonate, sodium hydrogen carbonate, monosodium phosphate, disodium phosphate, trisodium phosphate, shell calcium, egg shell calcium and mixtures thereof.

10. The process of claim 1, wherein said alkaline coagulating agent is 0.02 to 0.06 times by weight that of the powdered konnyaku.

11. The process of claim 1, wherein said coating agent is reacted until temperature at an innermost part of the konnyaku gel structure reaches 85° to 130° C.

* * * * *